(12) United States Patent
Liu et al.

(10) Patent No.: US 7,682,771 B2
(45) Date of Patent: Mar. 23, 2010

(54) COMPOSITIONS CONTAINING PHOTOSENSITIVE FLUOROCHEMICAL AND USES THEREOF

(75) Inventors: Junkang J. Liu, Woodbury, MN (US); Mark J. Pellerite, Woodbury, MN (US); George G. I. Moore, Afton, MN (US); Michael A. Semonick, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 719 days.

(21) Appl. No.: 11/317,682

(22) Filed: Dec. 23, 2005

(65) Prior Publication Data

US 2006/0199029 A1 Sep. 7, 2006

Related U.S. Application Data

(60) Provisional application No. 60/640,260, filed on Dec. 29, 2004.

(51) Int. Cl.
*G03F 7/004* (2006.01)
(52) U.S. Cl. .............. 430/270.1; 524/556; 428/500; 430/176
(58) Field of Classification Search .............. 430/270.1, 430/176; 428/500; 524/556
See application file for complete search history.

(56) References Cited

U.S. PATENT DOCUMENTS

| | | | |
|---|---|---|---|
| 3,250,808 A | 5/1966 | Moore Jr. et al. | |
| 3,282,905 A | 11/1966 | Fasick et al. | |
| 3,544,537 A | 12/1970 | Brace | |
| 3,553,179 A | 1/1971 | Bartlett | |
| 4,178,303 A | 12/1979 | Lorenz et al. | |
| 4,348,530 A | 9/1982 | Kvita et al. | |
| 4,424,325 A | 1/1984 | Tsunoda et al. | |
| 4,477,326 A | 10/1984 | Lin | |
| 4,594,400 A | 6/1986 | Kvita et al. | |
| 4,847,137 A | 7/1989 | Kellen et al. | |
| 5,002,979 A | 3/1991 | Stoyan | |
| 5,084,537 A | 1/1992 | Stoyan | |
| 5,264,533 A | 11/1993 | Rehmer et al. | |
| 5,389,699 A | 2/1995 | Rehmer et al. | |
| 5,484,822 A | 1/1996 | Minns | |
| 5,558,911 A | 9/1996 | Blum | |
| 5,667,050 A | 9/1997 | Hasegawa | |
| 6,087,412 A | 7/2000 | Chabrecek et al. | |
| 6,380,149 B2 | 4/2002 | Flynn et al. | |
| 6,395,459 B1 * | 5/2002 | Taylor et al. | 430/434 |
| 6,441,114 B1 * | 8/2002 | Peloquin et al. | 526/307.2 |
| 6,592,659 B1 | 7/2003 | Terrazas et al. | |
| 6,649,719 B2 | 11/2003 | Moore et al. | |
| 6,664,354 B2 | 12/2003 | Savu et al. | |
| 6,923,921 B2 | 8/2005 | Flynn et al. | |
| 7,241,404 B2 * | 7/2007 | Noda et al. | 252/587 |
| 2003/0226818 A1 | 12/2003 | Dunbar et al. | |
| 2004/0077237 A1 | 4/2004 | Audenaert | |
| 2004/0077775 A1 | 4/2004 | Audenaert et al. | |

FOREIGN PATENT DOCUMENTS

| | | |
|---|---|---|
| JP | 05-127394 | 5/1993 |
| WO | WO 99/16809 | 4/1999 |

OTHER PUBLICATIONS

Codding et al., "Fluorine-Containing Polymers. II. 1,1-Dihydroperfluoroalkyl Acrylates: Preparation of Monomers", Journal of Polymer Science, vol. XV, pp. 515-519 (1955).
Samuel et al., "Microstructured Fluorinated Nanofilms", Polymeric Materials: Science & Engineering 2004, 90, 290.
Shimizu et al., "Ordered Structure of Poly (1H, 1H-fluoroalkyl α-fluoroacrylate)s", Macromolecules 1996, 29, 156-164.

* cited by examiner

*Primary Examiner*—Peter D. Mulcahy
*Assistant Examiner*—Henry Hu
(74) *Attorney, Agent, or Firm*—Kathleen B. Gross; Scott A. Bardell

(57) ABSTRACT

In one aspect, the invention provides a fluorochemical composition comprising a mixture of: a fluorochemical selected from the formula:

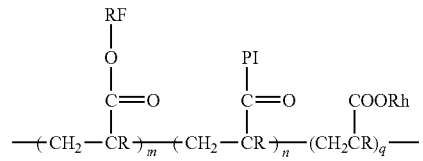

wherein RF is a fluorinated group having the formula: $R_f$—W—, wherein $R_f$ is a perfluoroalkyl or perfluoropolyether group and W is a divalent linking group;
PI is a monovalent pendant organic moiety comprising benzophenone, substituted benzophenone, acetophenone, or substituted acetophenone groups;
R is H, $CH_3$, or F; Rh is lower alkyl selected from the group consisting of linear or branched alkyl groups having from 1 to about 8 carbon atoms, cycloalkyl-containing alkyl groups having from 4 to about 8 carbon atoms, and cycloalkyl groups having from 3 to about 8 carbon atoms, all optionally containing catenated O or N atoms;
m is at least 2;
n is at least 1;
q is zero or greater; and
a hydrofluoroether.

9 Claims, No Drawings

COMPOSITIONS CONTAINING PHOTOSENSITIVE FLUOROCHEMICAL AND USES THEREOF

CROSS REFERENCE TO RELATED APPLICATION

This application claims the benefit of U.S. Provisional Patent Application No. 60/640,260, filed Dec. 29, 2004.

BACKGROUND

The present invention relates to compositions containing a photosensitive fluorochemical polymer and uses thereof.

Fluorochemical acrylates have been used for surface protection. For example, fluorochemical polyacrylates have been used as anti-graffiti or easy-clean coating for signs or displays and release coatings for use on release liners used to protect pressure-sensitive adhesive tapes from self-adherence. Such coatings typically also included inorganic fillers to improve abrasion resistance of the coatings.

Examples of fluorochemical acrylates that have been used in such applications include those derived from poly(hexafluoropropylene oxide), poly(difluoromethylene oxide-co-tetrafluoroethylene oxide), and N-methyl perfluorobutanesulfonamidoethyl acrylate.

Some of the fluorochemical acrylates that have been used for surface protection have had poor adhesion to the substrate, have cured incompletely, and have been incompatible with conventional crosslinkers. Others are effective for their intended purpose, but are expensive to manufacture or difficult to use in a coatings manufacturing process.

SUMMARY

In one embodiment, the invention provides a fluorochemical composition comprising a mixture of:
(A) fluorochemical copolymer selected from the formula:

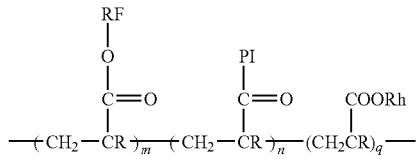

wherein RF is a fluorinated group having the formula: $R_f$—W—, wherein $R_f$ is a perfluoroalkyl or perfluoropolyether group and W is a divalent linking group;
PI is a monovalent pendant organic moiety comprising benzophenone, substituted benzophenone, acetophenone, or substituted acetophenone groups;
R is H, $CH_3$, or F;
Rh is lower alkyl selected from the group consisting of linear or branched alkyl groups having from 1 to about 8 carbon atoms, cycloalkyl-containing alkyl groups having from 4 to about 8 carbon atoms, and cycloalkyl groups having from 3 to about 8 carbon atoms, all optionally containing catenated O or N atoms;
m is at least 2;
n is at least 1;
q is zero or greater; and
(B) a hydrofluoroether.

In another embodiment, the invention provides an article comprising: a polymeric substrate; and a fluorochemical composition on a surface of the substrate wherein the fluorochemical composition comprises fluorochemical having the above formula.

In another embodiment, the invention provides fluorochemical copolymer composition comprising:
a fluorochemical selected from the formula:

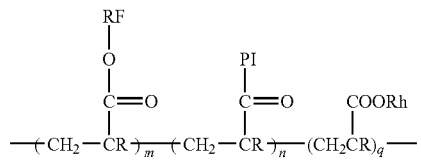

wherein RF is a fluorinated group having the formula: $R_f$—W—, wherein $R_f$ is a perfluoropolyether group and W is a divalent linking group;
PI is a monovalent pendant organic moiety comprising benzophenone, substituted benzophenone, acetophenone, or substituted acetophenone groups;
R is H, $CH_3$, or F;
Rh is lower alkyl selected from the group consisting of linear or branched alkyl groups having from 1 to about 8 carbon atoms, cycloalkyl-containing alkyl groups having from 4 to about 8 carbon atoms, and cycloalkyl groups having from 3 to about 8 carbon atoms;
m is at least 2;
n is at least 1;
q is zero or greater.

In another embodiment, the invention provides fluorochemical copolymer composition comprising:
a fluorochemical selected from the formula:

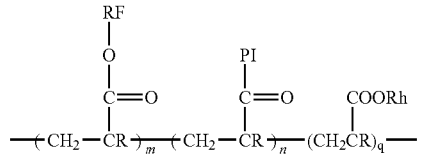

wherein RF is a fluorinated group having the formula: $R_f$—W—, wherein $R_f$ is a perfluoroalkyl group and W is a divalent linking group;
PI is a monovalent pendant organic moiety comprising benzophenone, substituted benzophenone, acetophenone, or substituted acetophenone groups;
R is H, $CH_3$, or F;
Rh is lower alkyl selected from the group consisting of linear or branched alkyl groups having from 1 to about 8 carbon atoms, cycloalkyl-containing alkyl groups having from 4 to about 8 carbon atoms, and cycloalkyl groups having from 3 to about 8 carbon atoms;
m is at least 2;
n is at least 1;
q is zero or greater, wherein n/(n+m+q) is less than 0.1.

DETAILED DESCRIPTION

This invention describes a class of fluorochemical acrylic copolymers bearing pendant groups comprising benzophenone, substituted benzophenone, acetophenone, or substituted acetophenone moieties which can generate free radicals upon irradiation with ultraviolet light sources. These copolymers are useful for generation of bound fluorochemical coatings on a range of substrates, particularly polymer films. The invention also includes a method for use of these materials and generation of coated articles.

Specifically, the invention relates to compositions, articles, and methods containing or using fluorochemicals selected from the Formula I:

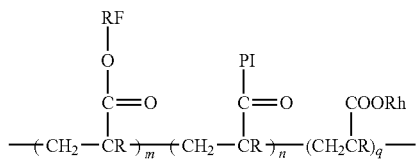

wherein RF is a fluorinated group having the formula: $R_f$—W—, wherein $R_f$ is a perfluoroalkyl or perfluoropolyether group and W is a divalent linking group;

PI is a monovalent pendant organic moiety comprising benzophenone, substituted benzophenone, acetophenone, or substituted acetophenone groups;

R is H, $CH_3$, or F; and

Rh is lower alkyl selected from the group consisting of linear or branched alkyl groups having from 1 to about 8 carbon atoms, cycloalkyl-containing alkyl groups having from 4 to about 8 carbon atoms, and cycloalkyl groups having from 3 to about 8 carbon atoms, and all optionally containing catenated O or N atoms;

m is at least 2;

n is at least 1; and q is zero or greater.

In other embodiments, $R_f$ is a perfluoroalkyl group and n/(n+m+q) is less than 0.1, 0.075, 0.05, 0.025, 0.01, or any number less than 0.1 and greater than 0.

The perfluorinated group $R_f$ can be linear, branched, cyclic, or combinations thereof. If $R_f$ is a perfluoroalkyl group, it contains from 1 to 18 carbon atoms and can optionally contain one catenated O or N atom. If $R_f$ is a perfluoropolyether group, it has at least two catenated oxygen heteroatoms. Exemplary perfluoropolyethers include, but are not limited to, those that have perfluorinated repeating units selected from the group of —$(C_pF_{2p})$—, —$(C_pF_{2p}O)$—, —(CF(X))—, —(CF(X)O)—, —(CF(X)$C_pF_{2p}$O)—, —($C_pF_{2p}$CF(X)O)—, —($CF_2$CF(X)O)—, or combinations thereof. In these repeating units, p is typically an integer of 1 to 10. In some embodiments, p is an integer of 1 to 8, 1 to 6, 1 to 4, or 1 to 3.

The X group is a perfluoroalkyl group, perfluoroether group, perfluoropolyether, or a perfluoroalkoxy group, all of which can be linear, branched, or cyclic. The X group typically has no more than 12 carbon atoms, no more than 10 carbon atoms, or no more than 9 carbon atoms, no more than 4 carbon atoms, no more than 3 carbon atoms, no more than 2 carbon atoms, or no more than 1 carbon atom. In some embodiments, the X group can have no more than 4, no more than 3, no more than 2, no more than 1, or no oxygen atoms. In these perfluoropolyether structures, the different repeat units can be distributed randomly along the chain. R is desirably monovalent.

Exemplary perfluoroalkyl groups include $CF_3$—, $CF_3CF_2$—, $CF_3CF_2CF_2$—, $(CF_3)_2CF$—, $CF_3CF_2CF_2CF_2$—, $CF_3OCF_2CF_2$—, and $(CF_3)_2NCF_2CF_2$—. In compounds where $R_f$ is a monovalent perfluoropolyether group, the inert terminal groups can be $(C_pF_{2p+1})$—, $(C_pF_{2p+1}O)$—, ($X'C_pF_{2p}O$)—, or ($X'C_pF_{2p+1}$)— where X' is hydrogen, chlorine, or bromine and p is an integer of 1 to 10. In some embodiments of monovalent perfluoropolyether $R_f$ groups, the terminal group is perfluorinated and p is an integer of 1 to 10, 1 to 8, 1 to 6, 1 to 4, or 1 to 3. Exemplary monovalent perfluoropolyether $R_f$ groups include $C_3F_7O(CF(CF_3)CF_2O)_aCF(CF_3)$—, $C_3F_7O(CF_2CF_2CF_2O)_aCF_2CF_2$—, and $CF_3O(C_2F_4O)_aCF_2$— wherein a has an average value of 0 to 50, 1 to 50, 3 to 30, 3 to 15, or 3 to 10. Particularly useful is the monovalent group $C_3F_7O(CF(CF_3)CF_2O)_aCF(CF_3)$—, referred to herein as an oligo(hexafluoropropylene oxide) or HFPO group, where a has an average value of about 5 to 6.

As synthesized, perfluoropolyether group-containing compounds according to Formula I can include a mixture of $R_f$ groups. The average structure is the structure averaged over the mixture components. The values of n in these average structures can vary, as long as the perfluoropolyether group has a number average molecular weight of at least about 400. Compounds of Formula I often have a molecular weight (number average) of 400 to 5000, 800 to 4000, or 1000 to 3000.

The linking group W between the $R_f$ segment and the acryl, methacryl or fluoroacryl (—OCOCR=$CH_2$ where R is H, F, or $CH_3$) end group includes a divalent group selected from an alkylene, arylene, heteroalkylene, or combinations thereof and an optional divalent group selected from carbonyl, carbonyloxy, carbonylimino, sulfonamido, or combinations thereof. Linking group W can be unsubstituted or substituted with an alkyl, aryl, halo, or combinations thereof. The W group typically has no more than 30 carbon atoms. In some compounds, the W group has no more than 20 carbon atoms, no more than 10 carbon atoms, no more than 6 carbon atoms, no more than 4 carbon atoms, or no more than 1 carbon atom. For example, W can be an alkylene, an alkylene substituted with an aryl group, or an alkylene in combination with an arylene.

Examples of specific W groups include, but are not limited to, difunctional groups: —C(O)NH($C_kH_{2k}$)—, —$SO_2$NR($C_kH_{2k}$)—, —($C_jH_{2j}$)—; —CH($R_f$)—; —$CH_2$O($C_kH_{2k}$)—, —C(O)S($C_kH_{2k}$)—, and —$CH_2$OC(O)N(R)($C_kH_{2k}$)—, wherein R is hydrogen or a $C_1$-$C_4$ alkyl group, and wherein k is 2 to 25 and j is 1 to 25.

Examples of specific linking groups (W) are —C(O)NH($CH_2$)$_2$—, —$CH_2$—, —$CH_2$O($CH_2$)$_3$—, and —$CH_2$OC(O)N(R)($CH_2$)$_2$.

Examples of perfluoroalkyl acrylate compounds used to make the polymers of Formula I include $C_4F_9SO_2$N($CH_3$)$C_2H_4$OCOCH=$CH_2$ and $C_4F_9SO_2$N($CH_3$)$C_2H_4$OCOC($CH_3$)=$CH_2$, described by Savu et al. in U.S. Pat. No. 6,664,354; $(CF_3)_2$CFCH(OCOCH=$CH_2$)$C_3F_7$, described by Moore et al. in U.S. Pat. No. 6,649,719; $CF_3CF_2CF_2CH_2$OCOCH=$CH_2$, as described by Codding et al. in Journal of Polymer Science 1955, 15, 515; $C_8F_{17}C_2H_4$OCOC($CH_3$)=$CH_2$, as described by Fasick and Reynolds in U.S. Pat. No. 3,282,905; $C_8F_{17}CH_2CH_2$OCOCF=$CH_2$, as described by Shimizu et al. in Macromolecules 1996, 29, 156; and $(CF_3)_2$CHOCOCH=$CH_2$, available from Aldrich Chemical.

Such perfluoropolyether acrylate monomers used to make the polymers of Formula I can be synthesized by known techniques such as described in U.S. Pat. Nos. 3,553,179 and 3,544,537, as well as U.S. Publication No. 2004/0077775 A1, filed May 23, 2003, "Fluorochemical Composition Comprising a Fluorinated polymer and Treatment of a Fibrous Substrate Therewith". Examples of three especially useful perfluoropolyether monoacrylate compounds are HFPO—C(O)

N(H)CH$_2$CH$_2$OC(O)CH=CH$_2$, HFPO—C(O)N(H)CH$_2$CH$_2$OC(O)C(CH$_3$)=CH$_2$, and HFPO—CH$_2$OCOCH=CH$_2$ where "HFPO" is defined above.

Specific perfluoropolyether- and perfluoroalkyl-substituted acrylate monomers used in synthesis of the polymers of formula I are

C$_3$F$_7$O(CF(CF$_3$)CF$_2$O)$_5$CF(CF$_3$)CH$_2$OCOCH=CH$_2$;

C$_3$F$_7$O(CF(CF$_3$)CF$_2$O)$_5$CF(CF$_3$)CONHC$_2$H$_4$OCOCH=CH$_2$;

C$_3$F$_7$O(CF(CF$_3$)CF$_2$O)$_5$CF(CF$_3$)CONHC$_2$H$_4$OCOC(CH$_3$)=CH$_2$;

C$_4$F$_9$SO$_2$NMeC$_2$H$_4$OCOCH=CH$_2$;

(CF$_3$)$_2$CFCH(OCOCH=CH$_2$)C$_3$F$_7$;

CF$_3$CH(OCOCH=CH$_2$)C$_6$F$_{13}$;

C$_3$F$_7$CH$_2$OC(O)CH=CH$_2$;

(CF$_3$)$_2$CHOCOCH=CH$_2$; and

C$_8$F$_{17}$CH$_2$CH$_2$OC(O)CH=CH$_2$.

The polymerizable photoinitiator used to make the polymers of the invention is characterized as having a polymerizable vinyl group, such as OCOCR=CH$_2$, where R is H or methyl, and a UV-absorbing group, such as benzophenone or acetophenone or substituted derivatives. Exemplary of this class are 4-(acryloxy)benzophenone, 4-(acryloxy)acetophenone, 2-(acrylamido)acetophenone, and 4-(acryloxyethoxy)benzophenone, all described by Kellen and Taylor in U.S. Pat. No. 4,847,137 as crosslinkers for acrylic adhesives. Another copolymerizable UV initiator is EBACRYL P36, available from UCB Chemicals, having the formula 2-[4-ClC$_6$H$_4$C(O)]C$_6$H$_4$C(O)OC$_4$H$_8$OC(O)CH=CH$_2$.

Lower alkyl acrylates optionally useful in making the polymers of the invention include C$_1$ to C$_8$ acrylates and methacrylates, which can further contain catenary O or N atoms. Exemplary of such lower alkyl acrylates are butyl acrylate, dimethylaminoethyl methacrylate, and ethoxyethyl acrylate. Such alkyl acrylates may be optionally added in small amounts, for example, 5 weight percent or less, to the predominately fluorochemical composition.

The polymers of the invention are conveniently made by thermal initiation of radical polymerization of the monomer mixtures in solution, although they could also be made by emulsion or suspension techniques. Useful compositions contain predominantly the fluoromonomer (generally 85 to 99% by weight on a total solids basis, 1-5% by weight (total solids) of the photoinitiator monomer, and, if present, up to 10% by weight (total solids) of the alkyl acrylate monomer). Allowed values of ratios relating the subscripts m, n, and q in Formula I are such as to be consistent with the abovementioned weight percents of the various comonomers.

Exemplary thermal initiators include "azo" compounds such as VAZO 67 thermal initiator available from DuPont, Wilmington, Del., and "peroxy" compounds such as ammonium persulfate.

The choice of solvents for polymerization is determined by the solubility of the monomers and resultant polymers. For monomers such as C$_4$F$_9$SO$_2$N(CH3)C$_2$H$_4$OCOCH=CH$_2$ and acryloxybenzophenone, conventional organic solvents such as ethyl acetate and methyl isobutyl ketone can be used. For more highly fluorinated monomers such as perfluoropolyether acrylates, a more highly fluorinated solvent such as a chlorofluorocarbon or a hydrofluoroether (HFE) is needed. In some cases, a mixture of an HFE and an organic solvent such as ethyl acetate has been found useful to bring the perfluoropolyether acrylate and the polymerizable photoinitiator into the same solvent phase. The polymerization is conducted at moderate temperature and times, exemplified for solution reactions at 55-65° C. and 18-48 hours.

The polymeric product solution can be diluted further with a solvent such as an HFE, usually to 0.2 to 2% concentration by weight, and coated or sprayed onto a substrate which contains aliphatic C—H bonds, such as polyethylene terephthalate, amine-primed polyethylene terephthalate, polycarbonate, trimethylolpropanetriacrylate (TMPTA) and pentaerythritol tetraacrylate (PETA)-based hardcoats such as described by Bilkadi and May et al. in U.S. Pat. No. 5,667,050, biaxially oriented polypropylene, nylons, polycaprolactone, poly(methyl methacrylate), bisphenol A polycarbonate, polypropylene, polystyrene, or cellulose triacetate.

Hydrofluoroethers (HFEs) suitable for use as a solvent in preparing and in coating compositions of the invention are generally low polarity chemical compounds minimally containing carbon, fluorine, hydrogen, and catenary (that is, in-chain) oxygen atoms. HFEs can optionally contain additional catenary heteroatoms, such as nitrogen and sulfur. HFEs have molecular structures that can be linear, branched, or cyclic, or a combination thereof (such as alkylcycloaliphatic), and are preferably free of ethylenic unsaturation, having a total of about 4 to about 20 carbon atoms. Such HFEs are known and are readily available, either as essentially pure compounds or as mixtures. In one embodiment, hydrofluoroethers can have a boiling point in the range from about 30° C. to about 275° C., and in other embodiments, from about 50° C. to about 200° C., and in other embodiments, from about 50° C. to about 110° C.

While a wide variety of HFEs are described by Flynn et al. in U.S. Pat. No. 6,380,149, C$_4$F$_9$OCH$_3$ (available as "HFE-7100" solvent from 3M Company, St. Paul, Minn.) and C$_4$F$_9$OC$_2$H$_5$ (available as "HFE-7200" solvent from 3M Company), or a combination thereof, are useful because of their solvent properties, boiling points, and commercial availability.

HFEs generally do not alter the surface appearance of the polymeric substrates being coated with the polymers of this invention. The polymer/HFE coated surface is allowed to dry and then is subjected to UV irradiation, such as in a model MC-6RQN photoprocessor commercially available from Fusion UV Systems Inc., Gaithersburg, Md. Irradiation can be done under an inert atmosphere, such as nitrogen, or for some substrates, under air. The cured product typically has a small residue of uncured polymer which can be left or removed by solvent rinse or by buffing with a dry fabric. The surface has an abrasion-resistant fluorochemical topcoat, evidenced by de-wetting of oil and water and by easy release of adhesive tape with minimal decrease in re-adhesion values.

EXAMPLES

These examples are merely for illustrative purposes only and are not meant to be limiting on the scope of the appended claims. All parts, percentages, ratios, etc. in the examples and the rest of the specification are by weight unless indicated otherwise.

| | Table of Abbreviations | |
|---|---|---|
| BA | Butyl acrylate, $C_4H_9OC(O)CH=CH_2$ | Sigma Aldrich, Milwaukee, WI |
| ABP | Acryloxybenzophenone, $C_6H_5COC_6H_4(O)COCH=CH_2$ | Made as described in U.S. Pat. No. 4,847,137, incorporated by reference for such preparation |
| HFPO-7-DHA | $C_3F_7O(iC_3F_6O)_5CF(CF_3)CH_2OC(O)CH=CH_2$ | Prepared as described below |
| HFPO-9-DHA | $C_3F_7O(CF(CF_3)CF_2)_7CF(CF_3)CH_2OC(O)CH=CH_2$ | Prepared as described below |
| HFPO-7-AEA | $C_3F_7O(CF(CF_3)CF_2O)_5CF(CF_3)CONHC_2H_4OC(O)CH=CH_2$ | Prepared as described below |
| HFPO-7-AEMA | $C_3F_7O(CF(CF_3)CF_2O)_5CF(CF_3)CONHC_2H_4OC(O)C(CH_3)=CH_2$ | Prepared as described below |
| HFIPA | $(CF_3)_2CHOCOCH=CH_2$ | Sigma Aldrich |
| 3-PFHA | $(CF_3)_2CFCH(OCOCH=CH_2)C_3F_7$ | Prepared as described in U.S. Pat. No. 6,649,719, incorporated by reference for such preparation |
| HFE | $C_4F_9OC_2H_5$ | 3M Company, St. Paul, MN |
| EtOAc | Ethyl acetate; $CH_3CO_2C_2H_5$ | Sigma Aldrich |
| VAZO 67 | $NCC(Me)(Et)N=NC(Me)(Et)CN$ | DuPont, Wilmington, DE |
| FOEA | $C_nF_{(2n+1)}C_2H_4OCOCH=CH_2$ n = 6, 8, 10; average 9.2 by nmr | Daikin |
| MeFBSEA | $C_4F_9SO_2N(CH_3)C_2H_4OCOCH=CH_2$ | Prepared as described in U.S. Pat. No. 6,664,354, Example 1, incorporated by reference for such preparation |

Preparation of $C_3F_7O(CF(CF_3)CF_2O)_7CF(CF_3)CH_2OC(O)CH=CH_2$(HFPO-DHA)

A stirred mixture of 30 g $NaBH_4$ (Aldrich), 50 mL HFE, and 400 mL dry dimethoxyethane was treated over 6 hours with 1000 g $C_3F_7O(CF(CF_3)CF_2O)_5CF(CF_3)COOCH_3$, resulting in an exotherm, and the mixture was stirred at 50° C. overnight. After cooling, the mixture was cautiously treated with first 50 mL MeOH and then 75 mL 5% HCl, with the first few mL of HCl causing vigorous foaming. Addition of 300 mL water, filtration of some white solid at the interphase, and stripping the lower layer gave 931 g $C_3F_7O(CF(CF_3)CF_2O)_5CF(CF_3)CH_2OH$. A solution of 322 g of this and 38.9 g diisopropylethylamine (Aldrich) in 150 mL HFE was treated dropwise with 25.0 g acryloyl chloride (Aldrich), forming a white solid. This was stirred overnight at 50° C., cooled, treated with 4 mL water, 5.0 g $K_2CO_3$, and 25 g silica gel, waiting about 2 hours between each addition. The mixture was filtered and stripped to give 297.5 g of HFPO-5-DHA.

Preparation of HFPO-7-DHA

This was made essentially as above, starting with $C_3F_7O(CF(CF_3)CF_2O)_7CF(CF_3)COOMe$, produced in the same fashion as the ester above.

Preparation of $C_3F_7O(CF(CF_3)CF_2O)_aCF(CF_3)COOCH_3$(HFPO—C(O)OCH$_3$)

$C_3F_7O(CF(CF_3)CF_2O)_aCF(CF_3)COOCH_3$(HFPO—C(O)OCH$_3$), wherein a averages about 5.8, with an average molecular weight of 1,211 g/mol, can be prepared according to the method reported in U.S. Pat. No. 3,250,808 (Moore et al.), the disclosure of which is incorporated herein by reference, with purification by fractional distillation.

Preparation of HFPO—C(O)N(H)CH$_2$CH$_2$OC(O) CH═CH$_2$(HFPO-AEA)

HFPO—C(O)OCH$_3$ (i.e., Mw=1211 g/mole, 50 g) was placed in a 200 mL round bottom flask. The flask was purged with nitrogen and placed in a water bath to maintain a temperature of 50° C. or less. To this flask was added 3.0 g (0.045 mol) of 2-aminoethanol. The reaction mixture was stirred for about 1 hour, after which time an infrared spectrum of the reaction mixture showed complete loss of the methyl ester band at 1790 cm$^{-1}$ and the presence of the strong amide carbonyl stretch at 1710 cm$^{-1}$. Methyl t-butyl ether (MTBE, 200 mL) was added to the reaction mixture and the organic phase was extracted twice with water/HCl (about 5%) to remove unreacted amine and methanol. The MTBE layer was dried with MgSO$_4$. The MTBE was removed under reduced pressure to yield a clear, viscous liquid. Proton ($^1$H) Nuclear magnetic resonance spectroscopy (NMR) and infrared spectroscopy (IR) confirmed the formation of HFPO—C(O)N(H) CH$_2$CH$_2$OH(HFPO-AE-OH).

The above product, HFPO-AE-OH (600 g) was combined with ethyl acetate (600 g) and triethylamine (57.9 g) in a 3-neck round bottom flask that was fitted with a mechanical stirrer, a reflux condenser, addition funnel, and a hose adapter that was connected to a source of nitrogen gas. The mixture was stirred under a nitrogen atmosphere and was heated to 40° C. Acryloyl chloride (51.75 g obtained from Aldrich Chemical) was added dropwise to the flask from the addition funnel over about 30 minutes. The mixture was stirred at 40° C. overnight. The mixture was then allowed to cool to room temperature, diluted with 300 mL of 2N aqueous HCl and transferred to a separatory funnel. The aqueous layer was removed and the ethyl acetate layer was extracted with another 300 mL portion of 2N HCl. The organic phase was then extracted once with 5 weight percent aqueous NaHCO$_3$ separated, dried over MgSO$_4$ and filtered. Removal of the volatile components using a rotary evaporator resulted in 596 g of product (93% yield). Proton ($^1$H) NMR and IR spectroscopy confirmed the formation of HFPO-AEA.

Preparation of HFPO-AEMA

HFPO—C(O)N(H)CH$_2$CH$_2$OC(O)C(CH$_3$)═CH$_2$ (HFPO-AEMA) is made by a procedure similar to that described in U.S. Publication No. 2004-0077775, entitled "Fluorochemical Composition Comprising a Fluorinated Polymer and Treatment of a Fibrous Substrate Therewith," filed on May 24, 2002, for Synthesis of (HFPO)$_k$-methacrylate, substituting C$_3$F$_7$O(CF(CF$_3$)CF$_2$O)$_a$CF(CF$_3$)C(O) NHCH$_2$CH$_2$OH with a=5.8, molecular weight 1344, for the C$_3$F$_7$O(CF(CF$_3$)CF$_2$O)$_a$CF(CF$_3$)C(O)NHCH$_2$CH$_2$OH with a=9.5.

Examples 1-2 and 4-14 and Comparative Example C-3

Polymers were made by charging a bottle with the monomers and solvent(s) indicated, in the amounts indicated in Table 1 below, with VAZO 67, purging the bottles with nitrogen for about 35 seconds, and then heating the bottles at 60° C. in a rotating water bath for about 24 hours. The amounts of VAZO 67 used was as follows: Example 1: 0.6 weight percent; Examples 3-14: 0.3 weight percent.

TABLE 1

| Example | Fluoroacrylate/HC acrylate (g) | Photoinitiator (g) | Solvent(s) (g) |
|---|---|---|---|
| 1 | HFPO-9-DHA (4.95) | ABP (0.05) | HFE (20) |
| 2 | HFPO-9-DHA (4.80) | ABP (0.20) | HFE (20) |
| C-3 | HFPO-9-DHA (10.0) | ABP (0.0) | HFE (20)/EtOAc (5) |
| 4 | HFPO-9-DHA (10.0) | ABP (0.10) | HFE (20)/EtOAc (5) |
| 5 | HFPO-7-AEA (10.0) | ABP (0.10) | HFE (20)/EtOAc (5) |
| 6 | HFPO-7-AEMA (10.0) | ABP (0.10) | HFE (20)/EtOAc (5) |
| 7 | MeFBSEA (10.0) | ABP (0.10) | HFE (20)/EtOAc (5) |
| 8 | HFPO-7-DHA (9.7)/BA (0.5) | ABP (0.10) | HFE (20)/EtOAc (5) |
| 9 | HFPO-7-DHA (9.4)/BA (0.5) | ABP (0.10) | HFE (20)/EtOAc (5) |
| 10 | HFPO-7-AEA (9.7)/BA (0.2) | ABP (0.10) | HFE (20)/EtOAc (5) |
| 11 | HFPO-7-AEA (9.4)/BA (0.5) | ABP (0.10) | HFE (20)/EtOAc (5) |
| 12 | HFIPA (5.0) | ABP (0.10) | EtOAc (20) |
| 13 | HFPO-7-DHA (5.0) | ABP (0.10) | HFE (15)/EtOAc (5) |
| 14 | 3-PFHA (5.0) | ABP (0.1) | EtOAc (20) |

The above polymers were coated with a #8 Meyer rod at 6 to 25% concentration on an unprimed PET sheet (commercially available from 3M Company), and were irradiated in a mercury lamp UV photoprocessor. The resulting films were either rubbed with paper wipe or rinsed with HFE to remove any unbound polymer.

An ink marking was applied to the surface layer with a pen commercially available under the trade designation "Sanford Sharpie, Fine Point permanent marker, No. 30001". Observations were made to determine whether the ink mark beaded up when applied to the surface (i.e., "yes" per Table 2) or did not bead up (i.e., "no" per Table 2).

TABLE 2

| Example | Ink Bead-Up-initial | Ink bead-up after rubbing off initial pen mark |
|---|---|---|
| 1 | Yes | Yes |
| 2 | Yes | Yes |
| C-3 | No | No |
| 4 | Yes | Yes |
| 5 | Yes | Yes, less |
| 6 | Yes | Yes, less |
| 7 | Yes | No |
| 8 | Yes | Yes |
| 9 | Yes | Yes |
| 10 | Yes | Yes, less |
| 11 | Yes | Yes, less |
| 12 | Yes | No |
| 13 | Yes | Yes |
| 14 | Yes | Yes, less |

Subsequent trials with Example 4 showed good bonding when coated at 2% and 0.2% concentrations, with less excess material noted at the 0.2% level.

The polymer solution prepared by dilution of the copolymer from Example 1 was applied to a commercially available matte hardcoated PET film substrate obtained from U.S.A. Kimoto Tech, Cedartown, Ga. under the trade designation "N4D2A" (S-2). The matte film was used without further modification. For this coating step, the solution was applied to the hardcoated film using a metered, precision die coating process. A flow meter was used to monitor and set the flow rate of the material from a pressurized container. The flow rate was adjusted by changing the air pressure inside the sealed container which forces liquid out through a tube, through a filter, the flow meter and then through the die. A syringe pump was used to meter the solution into the die. The solution was diluted to a concentration of 2 wt % solids as indicated above and coated onto the hardcoat to achieve a nominal dry thickness of 60 nm. The material was dried in a conventional air flotation oven and then sent through a UV chamber having less than 50 ppm oxygen. The UV chamber was equipped with a 600 watt H-type bulb from Fusion UV systems, Gaithersburg, Md., operating at full power.

for each example, specifying the weight in grams applied to the stylus and the number of wipes employed during testing.

Examples 15-22

Polymers were made by charging a bottle with the monomers and solvent(s) indicated, in the amounts indicated in Table 1 below, with VAZO 67, purging the bottles with nitrogen for about 35 seconds, and then heating the bottles at 60° C. in a rotating water bath for about 24 hours, except example 20 and 22 were held for about 48 hours. The amounts of VAZO 67 used were as follows: Examples 15-18 0.080 g; Examples 19-22 0.030 g.

TABLE 3

| Example | Fluoroacrylate/HC acrylate (g) | Photoinitiator (g) | Solvent(s) (g) |
|---|---|---|---|
| 15 | FOEA (9.90) | ABP (0.10) | HFE (29.7)/EtOAc (10.3) |
| 16 | FOEA (9.50) | ABP (1.80) | HFE (29.7)/EtOAc (15.4) |
| 17 | MeFBSEA (9.90) | ABP (0.10) | HFE (29.7)/EtOAc (10.3) |
| 18 | MeFBSEA (9.00) | ABP (1.58) | HFE (29.7)/EtOAc (14.7) |
| 19 | HFPO-7-DHA (5.0) | ABP (0.05) | HFE (15.0)/EtOAc (5.0) |
| 20 | HFPO-7-DHA (5.0) | ABP (0.05) | HFE (15.0)/EtOAc (5.0) |
| 21 | HFPO-7-DHA (5.0)/BA (0.11) | ABP (0.05) | HFE (15.0)/EtOAc (5.0) |
| 22 | HFPO-7-DHA (5.0)/BA (0.10) | ABP (0.05) | HFE (15.0)/EtOAc (5.0) |

The surface layer coating and drying parameters were as follows:

| | |
|---|---|
| Coating width: | 4" (10 cm) |
| Web Speed: | 10 feet per minute |
| Solution % Solids: | 2.0% |
| Pump: | 60 cc Syringe Pump |
| Flow rate: | 1.2 cc/min |
| Wet Coating Thickness: | 4.1 microns |
| Dry Coating Thickness: | 60 nm |
| Conventional Oven Temps: | 65° C. Zone 1 |
| | 65° C. Zone 2 |
| Length of oven | 10 feet (3 m) |

A sample of the coating was rinsed with HFE 7100 to remove unbound coating material, then tested according to the ink beading test and found to give dewetting of the ink into hemispherical droplets. The ink test was repeated after subjecting the coating to 250 and 500 wipes in the steel wool test under a 1 kg weight. Unchanged ink beading and no scratching were observed after 250 wipes, and partial ink beading and slight scratching were observed after 500 rubs, demonstrating mechanical durability of the fluorochemical coating. Water static/advancing/receding contact angles were measured on the fresh coating sample after rinsing and found to be 116/121/106 degrees.

Abrasion Test and Results

The abrasion resistance of coatings was tested cross-web to the coating direction by use of a mechanical device capable of oscillating steel wool fastened to a stylus (by means of a rubber gasket) across the film's surface. The stylus oscillated over a 10 cm wide sweep width at a rate of 3.5 wipes/second wherein a "wipe" is defined as a single travel of 10 cm. The stylus had a flat, cylindrical geometry with a diameter of 6 mm. The device was equipped with a platform on which weights were placed to increase the force exerted by the stylus normal to the film's surface. The steel wool was obtained from Rhodes-American a division of Homax Products, Bellingham, Wash. under the trade designation "#0000-Super-Fine" and was used as received. A single sample was tested Examples 15-22 were diluted to 2% by weight solids with HFE and coated using a Meyer rod onto 2 mil unprimed PET sheet (3M Company) and irradiated in a UV Fusion 300 W H-bulb photoprocessor in an air atmosphere.

Water Contact Angle

The coatings were rinsed for 1 minute by hand agitation in IPA before being subjected to measurement of water contact angles. Measurements were made using deionized water filtered through a filtration system obtained from Millipore Corporation (Billerica, Mass.), on a video contact angle analyzer available as product number VCA-2500XE from AST Products (Billerica, Mass.). Reported values are the averages of measurements on at least three drops measured on the right and the left sides of the drops, and are shown in Table 4. Drop volumes were 5 μL for static measurements and 1-3 μL for advancing and receding.

TABLE 4

| | Contact Angles for water | | |
|---|---|---|---|
| Example | Static (°) | Advancing (°) | Receding (°) |
| 15 | 119 | 132 | 93 |
| 16 | 115 | 127 | 72 |
| 17 | 109 | 118 | 70 |
| 18 | 107 | 116 | 65 |
| 19 | 112 | 119 | N/A |
| 20 | 112 | 120 | 97 |
| 21 | 112 | 117 | 88 |
| 22 | 111 | 119 | 93 |

N/A means no measurement was made

Release and Readhesion Test Methods

This test measures the effectiveness of the release composition. The release value is a quantitative measure of the force required to remove a flexible adhesive tape from a substrate coated with the test composition at a specific angle and rate of removal. In the following examples, this force is expressed in g/in. After allowing the cured coatings to condition at room temperature and 50% relative humidity for 24 hours, release testing was conducted by laminating a 2.54 cm by 20.32 cm strip of the coated substrate (coated side up) to the stage of a slip/peel tester SP 2000, available from I-Mass Instruments, Accord, Mass., with double coated tape. A 1.91 cm by 15.24 cm strip of a pressure-sensitive adhesive (PSA) coated test tape was rolled down onto the laminate thus formed with a 2 kg rubber roller. The average force required to remove this tape at 180 degrees and a peel rate of 90 in/min (228.6 cm/minute) is reported in Table 5. Three samples were measured for each example.

Examples 15-18 exhibited slip/stick release behavior.

Readhesion was also measured by adhering the freshly peeled tape to a clean glass plate and measuring the peel adhesion in normal fashion using an SP-2000 slip/peel tester indicated above, again peeling at 90 in/min (228.6 cm/min) and at a 180° peel angle. Readhesions are reported as a percentage of the average force required to remove the sample from a clean glass plate versus the force required to remove a control tape sample from a clean glass plate that has not been adhered to the release coating. Comparative Example C-1 is 3M 610 tape, available from 3M Company. Three samples were measured for each example.

TABLE 5

| Example | Release (@ 90 inches/min; g/in) | Readhesion (@ 90 in/min; oz/in) |
|---|---|---|
| 15 | 112.2 | 25.91 |
|  | 89.3 | 21.72 |
|  | 76.0 | 17.96 |
| 16 | 78.3 | 59.52 |
|  | 63.7 | 59.76 |
|  | 67.7 | 60.38 |
| 17 | 87.0 | 58.55 |
|  | 93.0 | 58.26 |
|  | 105.3 | 57.64 |
| 18 | 206.2 | 57.26 |
|  | 120.5 | 58.92 |
|  | 121.8 | 57.75 |
| 19 | 48.8 | 48.86 |
|  | 43.1 | 43.28 |
|  | 48.3 | 45.11 |
| 20 | 101.7 | 40.61 |
|  | 74.9 | 36.7 |
|  | 190.9 | 39.61 |
| 21 | 63.4 | 36.81 |
|  | 87.6 | 38.86 |
|  | 74.2 | 39.6 |
| 22 | 45.4 | 44.71 |
|  | 46.7 | 44.46 |
|  | 48.1 | 47.35 |
| C-1 | N/A | 65.29 |
|  | N/A | 64.68 |
|  | N/A | 63.18 |

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A fluorochemical copolymer composition comprising:
(A) fluorochemical selected from the formula:

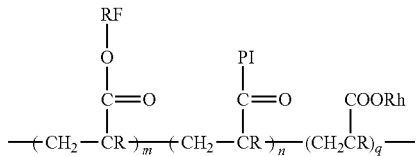

wherein RF is a fluorinated group having the formula: $R_f$—W—, wherein $R_f$ is a perfluoropolyether group and W is a divalent linking group;
PI is a monovalent pendant organic moiety comprising benzophenone, substituted benzophenone, acetophenone, or substituted acetophenone groups;
R is H, $CH_3$, or F;
Rh is lower alkyl selected from the group consisting of linear or branched alkyl groups having from 1 to about 8 carbon atoms, cycloalkyl-containing alkyl groups having from 4 to about 8 carbon atoms, and cycloalkyl groups having from 3 to about 8 carbon atoms;
m is at least 2;
n is at least 1;
q is zero or greater.

2. The composition of claim 1 wherein $R_f$ is $C_3F_7O(CF(CF_3)CF_2O)_aCF(CF_3)$—, $CF_3O(C_2F_4O)_aCF_2$—, or $C_3F_7O(CF_2CF_2CF_2O)_aCF_2CF_2$— wherein a has an average value of 0 to 50.

3. The composition of claim 2, wherein a has an average value from 3 to 30.

4. The composition of claim 2, wherein a has an average value from 3 to 10.

5. The composition of claim 1 wherein RF is $C_3F_7O(CF(CF_3)CF_2O)_7CF(CF_3)CH_2$—, $C_3F_7O(CF(CF_3)CF_2O)_5CF(CF_3)CH_2$—, or $C_3F_7O(CF(CF_3)CF_2O)_5CF(CF_3)CONHC_2H_4$—.

6. The composition of claim 1 wherein PI is $C_6H_5COC_6H_4$—.

7. The composition of claim 1, wherein n/(n+m+q) is less than 0.1.

8. A method of making an article comprising the steps of:
providing a substrate;
coating a surface of the substrate with a fluorochemical copolymer composition of claim 1; and
exposing the coated substrate to UV radiation.

9. The method of claim 8, wherein the substrate is a polymeric substrate selected from the group consisting of polyethylene terephthalate, amine-primed polyethylene terephthalate, polycarbonate, biaxially oriented polypropylene, nylons, polycaprolactone, poly(methyl methacrylate), bisphenol A polycarbonate, polypropylene, polystyrene, cellulose triacetate, and trimethylolpropanetriacrylate (TMPTA) and pentaerythritol tetraacrylate (PETA)-based hardcoats.

* * * * *

UNITED STATES PATENT AND TRADEMARK OFFICE
CERTIFICATE OF CORRECTION

PATENT NO. : 7,682,771 B2
APPLICATION NO. : 11/317682
DATED : March 23, 2010
INVENTOR(S) : Jacob Liu It is certified that error appears in the above-identified patent and that said Letters Patent is hereby corrected as shown below:

Column 5
Line 12, delete "$(CH_3)= CH_2$;" and insert in place thereof -- $(CH_3)=CH_2$; --.

Line 59, delete "$C_4F_9SO_2N(CH3)C_2H_4OCOCH=CH_2$" and insert in place thereof
-- $C_4F_9SO_2N(CH_3)C_2H_4OCOCH=CH_2$ --.

Column 7
Line 22 (approx.), delete "$C_3F_7O(CF(CF_3)CF_2\ O_5)$" and insert in place thereof
-- $C_3F_7O(CF(CF_3)CF_2O_5)$ --.

Signed and Sealed this
Twenty-second Day of February, 2011

David J. Kappos
*Director of the United States Patent and Trademark Office*